United States Patent [19]
Pages

[11] 3,853,757
[45] Dec. 10, 1974

[54] SUPPORT ELEMENTS FOR TUBULAR MEMBRANES AND PROCESS FOR MANUFACTURING THEM

[75] Inventor: Michel Pages, Ardeche, France

[73] Assignee: Rhone-Poulenc S.A., Paris, France

[22] Filed: Apr. 13, 1973

[21] Appl. No.: 351,039

[30] Foreign Application Priority Data
Apr. 19, 1972 France .............................. 72.13829

[52] U.S. Cl. .............. 210/23, 29/163.5 F, 210/433, 210/490, 264/41
[51] Int. Cl. ....................... B01d 31/00, B01d 13/00
[58] Field of Search ........... 210/321, 433, 490, 491; 264/41, 49; 29/163.5 F

[56] References Cited
UNITED STATES PATENTS
| | | | |
|---|---|---|---|
| 2,355,822 | 8/1944 | Rugeley | 210/490 |
| 3,442,389 | 5/1969 | Mendelson | 210/491 X |
| 3,457,170 | 7/1969 | Havens | 210/321 X |
| 3,494,470 | 2/1970 | Banfield | 210/490 X |
| 3,547,272 | 12/1970 | Shaines et al. | 210/321 |
| 3,712,473 | 1/1973 | Ellenburg | 210/433 X |

Primary Examiner—Frank A. Spear, Jr.
Attorney, Agent, or Firm—Cushman, Darby & Cushman

[57] ABSTRACT

A support element for a tubular membrane having particular utility in reverse osmosis and ultrafiltration comprising a support tube and a shrunk textile sheath in gripping contact with the outer surface of the support tube is manufactured by placing a shrinkable textile sheath around a support tube whose external diameter is smaller than the internal diameter of the sheath and shrinking the textile sheath so that it grips the outer surface of the support tube.

8 Claims, 2 Drawing Figures

3,853,757

SUPPORT ELEMENTS FOR TUBULAR MEMBRANES AND PROCESS FOR MANUFACTURING THEM

The present invention relates to support elements for tubular membranes, especially suitable for use in reverse osmosis and ultrafiltration.

Support elements for tubular membranes have already been described. Thus Annales de Chimie Analytique, 1925, No. 2, pages 33-34, M. FOUARD, describes elements consisting of rigid support tubes, perforated with small collecting holes distributed uniformly over the surface, covered with a braid of artificial silk forming an intermediate filtering layer against which there is pressed a sleeve with a network of wide meshes of 1 or 2 mm. made of a strong yarn, well tightened onto its support. Such elements are intended to support a membrane which is produced by depositing a layer of collodion onto the system using a special technique by means of which the collodion does not pass into the braided jacket, but nevertheless completely immerses the meshes of the yarn network, followed by coagulation by means of water. The production of such elements requires the use of a network which is strongly tensioned in order to hold the braiding on the support tube, and this is not easy to achieve. Moreover, this network is made of strong yarns of relatively large diameter which cause unevennesses in the thickness and brittleness of the membrane formed by applying collodion to such a network.

The present invention provides new support elements for tubular membranes which avoid these disadvantages. More specifically, the present invention provides a support element for a tubular membrane comprising a support tube and a shrunk textile sheath in gripping contact with the outer surface of the support tube.

The support element of the present invention can be manufactured by placing a shrinkable textile sheath around a support tube whose external diameter is smaller than the internal diameter of the sheath and shrinking the textile sheath so that it grips the outer surface of the support tube.

Thus, the sheath may be slipped over the support tube, the cross-section of the sheath being chosen so that after shrinking, the sheath presses completely against, or grips, the support tube, and the sheath then shrunk, at least in the transverse direction; the shrinking of the sheath may be performed by any suitable chemical and/or physical method.

The support tube can be any tube conventionally employed in the production of tubular filtering elements, and may be made of metal or of a polymer material, for example a rigid porous tube or a perforated tube.

The textile sheath used is of tubular shape, and its surface should not possess any appreciable unevenness or discontinuity. A sheath with practically non-deformable tightly woven texture, which can, for example, be produced by any known weaving, braiding or knitting process, is preferably used. These sheaths are generally manufactured continuously, in large lengths which can be cut into sections of appropriate length. They can be made of various textiles, including glass, but synthetic textiles are preferred, especially for their strength and their thermoelasticity. Advantageously, the sheath is partially or completely made of heat-shrinkable textile. The heat-shrinkable textile preferably contains yarns or fibres of a synthetic textile polymer, for example of polyvinyl chloride which has been stretched beforehand. Yarns or fibres formed from a mixture of polyvinyl chloride and chlorinated polyvinyl chloride, which is available commercially under the name "Clevyl", are very suitable.

Preferably the textile sheath is heat-shrinkable principally along its diameter. Such a textile sheath may be formed by uniformly combining yarns or fibres arranged in two types which cross substantially at right angles, the warp yarns, arranged longitudinally, being yarns which are stable to heat, and the weft yarns, arranged transversely, being heat-shrinkable yarns. An example of a suitable textile sheath is one consisting of warp yarns made of a polyolefin and of weft yarns consisting of a mixture of polyvinyl chloride and chlorinated polyvinyl chloride.

The heat shrinkable textile sheath is suitably placed around the tubular support and is then heated at an appropriate temperature for a period of time sufficient to cause the weft yarns to shrink around the tubular support, so that the sheath is positioned tightly around the support over the whole of the surface of the latter.

The sheath is thus prevented from forming any folds around its support. The membrane which may be applied to such a textile sheath, whether it be separated or formed in situ, is not therefore subjected to any abnormal localised stress by the textile support and its thickness remains constant over its entire surface area. This practically eliminates risks of bursting and enables the membrane to give the optimum performance.

The support element of the invention can comprise a single textile sheath or several superposed sheaths. The production of an element with several sheaths does not require any further operations other than those described for a single-sheath element.

The sheathed support elements of the invention are particularly suitable for the production of tubular filtering elements possessing membranes. The membrane can be prepared separately on a mandrel and then applied to the support by carrying out the usual techniques, or may be formed in situ by applying a collodion to the sheathed support; in this case, it is generally best to seal the pores of the sheath with a substance which can subsequently be removed easily, after the membrane has been produced; this temporary sealing of the pores is generally carried out by soaking the sheathed element in water before applying collodion, so that the pores are sealed with water.

The invention also includes within its scope a method for separating a liquid mixture by reverse osmosis or ultrafiltration wherein the liquid mixture is contacted with a membrane supported on a support element of the invention.

DESCRIPTION OF THE DRAWINGS

The invention will be understood more readily by reference to the accompanying drawings, wherein.

Figure 1:
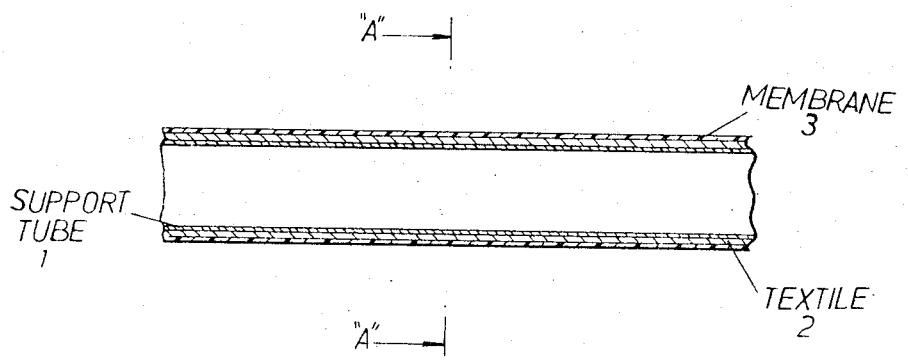
FIG. 1 is a longitudinal cross sectional view of a support element of the present invention.
Figure 2:
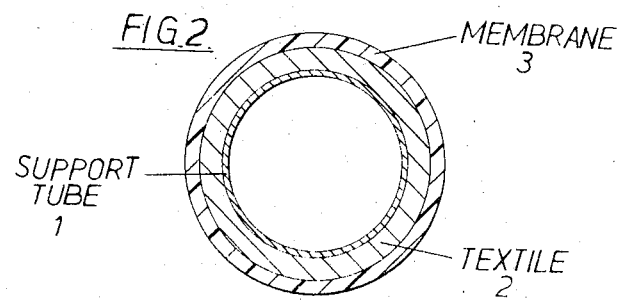
FIG. 2 is a transverse cross sectional view of the support element of FIG. 1 taken along line A—A.

In the Figures the support element includes support tube 1, suitably a rigid porous metal tube, textile element 2, which may be, for instance, heat shrinkable pre-stretched polyvinyl chloride, and membrane 3, which may be, for instance, cellulose acetate.

The invention is illustrated by the following Example.

EXAMPLE

A woven sheath with a reinforcement of the 5 on, 2 off satin type, of width 30 mm. when flat, in which the warp consists of a polypropylene yarn of 200 deniers, with 340 turns per metre, and the weft consists of bulked yarns of 70 deniers spun from a mixture of 83 percent by weight of polyvinyl chloride and 17 percent of post-chlorinated polyvinyl chloride, sold commercially under the tradename Clevil, is produced using 30 cop strokes to the centimetre per face, on both faces.

A portion of this sheath, of length 145 cm., is placed around a steel tube of internal diameter 1.35 cm., external diameter 1.8 cm. and length 150 cm., provided with perforations of diameter 0.08 cm. every 8.5 centimetres. The sheath and tube are then immersed in water at 85°C. for 5 minutes. The sheath shrinks along its diameter, thus bringing the sheath into contact with the tubular support over its entire surface; the sheath is thus held fixed of its own accord and stretched uniformly over the tubular support. No unevenness or discontinuity of the surface of the sheath is observed.

A collodion based on cellulose acetate is deposited on the element thus formed, according to the techniques described in French Pat. Nos. 1,426,548 and 1,506,402. The element thus treated is kept at a temperature of 0°C. for 30 minutes and is then subjected to a heat treatment which consists of bringing it to a temperature of 85°C. for 20 minutes. The membrane thus formed on the element is of even thickness and adheres well to the sheath.

I claim:

1. A support element for a tubular membrane comprising a support tube and a shrunk textile sheath in gripping contact with the outer surface of the support tube wherein the textile sheath is heat-shrinkable along its diameter and is made of a woven material in which the warp yarns, arranged longitudinally, are yarns which are stable to heat and the weft yarns, arranged transversely, are heat-shrinkable yarns.

2. A support element according to claim 1, wherein the warp yarns are made of a polyolefin and the weft yarns are made of a mixture of polyvinyl chloride and chlorinated polyvinyl chloride.

3. A support element according to claim 1, wherein the support tube is a perforated metal tube.

4. A process for the manufacture of a support element as defined in claim 1, which comprises placing a shrinkable textile sheath around a support tube whose external diameter is smaller than the internal diameter of the sheath and shrinking the textile sheath so that it grips the outer surface of the support tube.

5. A process according to claim 4, wherein the shrinking is carried out by heating the sheath and support tube.

6. A membrane assembly comprising a support element as defined in claim 1 having a membrane over the outer surface thereof.

7. A membrane assembly according to claim 6 wherein the membrane is cellulose acetate membrane.

8. In a method of separating a liquid mixture by reverse osmosis or ultrafiltration the improvement wherein the liquid mixture is contacted with a membrane assembly as defined in claim 6.

* * * * *

UNITED STATES PATENT OFFICE
CERTIFICATE OF CORRECTION

Patent No. 3,853,757    Dated December 10, 1974

Inventor(s) Michel Pages

It is certified that error appears in the above-identified patent and that said Letters Patent are hereby corrected as shown below:

IN THE HEADING:

At line [30] after "Foreign Application Priority Data", delete "April 19, 1972    France.........72.13829", and insert in lieu thereof --April 14, 1972    France    72.13251--.

Signed and sealed this 27th day of May 1975.

(SEAL)
Attest:

RUTH C. MASON
Attesting Officer

C. MARSHALL DANN
Commissioner of Patents
and Trademarks